United States Patent [19]

Green et al.

[11] Patent Number: 4,639,472

[45] Date of Patent: Jan. 27, 1987

[54] N-VINYL-2-OXAZOLIDINONES AS REACTIVE DILUENTS IN ACTINIC RADIATION CURABLE COATINGS

[75] Inventors: John G. Green; David G. Hunt, both of Baton Rouge, La.

[73] Assignee: The Dow Chemical Company, Midland, Mich.

[21] Appl. No.: 753,089

[22] Filed: Jul. 9, 1985

Related U.S. Application Data

[63] Continuation-in-part of Ser. No. 682,450, Dec. 17, 1984, abandoned.

[51] Int. Cl.⁴ .............................................. C08G 63/76
[52] U.S. Cl. ...................................... 522/107; 522/90; 522/103; 522/167; 522/169; 522/181
[58] Field of Search ..................... 204/159.15, 159.19; 522/107

[56] References Cited

U.S. PATENT DOCUMENTS

| | | | |
|---|---|---|---|
| 2,818,362 | 12/1957 | Drechsel | 154/43 |
| 2,919,279 | 12/1959 | Walles et al. | 260/307 |
| 3,033,829 | 5/1962 | Bakke | 260/77.5 |
| 3,455,801 | 7/1969 | D'Alelio | 204/159.19 |
| 3,539,540 | 11/1970 | Walles et al. | 260/80.3 |
| 4,065,624 | 12/1977 | Prucnall et al. | 428/522 |
| 4,182,802 | 1/1980 | Loshaek et al. | 526/264 |
| 4,301,209 | 11/1981 | Lorenz et al. | 428/339 |
| 4,364,972 | 12/1982 | Moon | 427/54.1 |

OTHER PUBLICATIONS

Chapters 4 and 5, Report No. 152, 4V Curing of Coatings, Printing Inks and Adhesives, Mar. 1982, Process Economics Program.

Celanese fact sheet, UV/EB Curable Resin, Celanese Plastics and Specialties Company.

*Primary Examiner*—Jacob Ziegler
*Attorney, Agent, or Firm*—A. J. Young

[57] ABSTRACT

An actinically curable composition containing (1) an oligomer having a molecular weight within the range of from about 200 to about 3000 and which is end capped with reactive functional groups to provide sites for free radical polymerization by actinic radiation and (2) as a reactive diluent, an N-vinyl-2-oxazolidinone in which the number 4 and 5 carbon atoms each have two constituents which are all independently selected from hydrogen and alkyl radicals having from 1 to 4 carbon atoms.

14 Claims, No Drawings

N-VINYL-2-OXAZOLIDINONES AS REACTIVE DILUENTS IN ACTINIC RADIATION CURABLE COATINGS

CROSS REFERENCE TO A RELATED APPLICATION

This application is a continuation-in part of my copending application Ser. No. 682,450 which was filed on Dec. 17, 1984, abandoned.

BACKGROUND OF THE INVENTION

Coating compositions which are curable under the influence of actinic radiation, e.g. ultra violet light, electron beam and the like, are well known. These coatings, generally contain, as the main characterizing component, oligomers which are end capped with functional groups. These functional groups provide sites for actinic radiation initiated free radical polymerization. Exemplary of some of these oligomers are those which are end-capped with acrylate or methacrylate groups and which have a polyester, urethane, epoxy, polyether or acrylic backbone.

It has been found that while the oligomers used in the coating compositions contribute many useful characteristics thereto, they all suffer one serious drawback, i.e., they are too viscous to insure convenient, high fidelity application to a substrate. The oligomer viscosity can be lowered by diluting it with one or more solvents. Useful solvents are methyl ethyl ketone, ethyl acetate, xylene, toluene, acetone and the like While solvents do reduce the viscosity of the oligomer their use is not widely acceptable as the solvent must be removed from the cured coating thereby adding additional expense to the total curing process.

As an alternative to using solvents, the coating industry has turned to using reactive diluents in admixture with the oligomer. The reactive diluent reacts with the oligomer during curing and becomes a part of the cured coating. No removal is needed. Exemplary of such diluents are styrene, vinyl toluene, methyl acrylate, butyl acrylate, propyl methacrylate etc. While these diluents perform their viscosity lowering function in a manner preferred to that of solvents, they are generally quite toxic. Great care and special safety equipment are required by workers who apply coating compositions containing such diluents. In response to this toxicity problem the coating industry is now moving towards the selection of reactive diluents which are satisfactory in their viscosity reducing function and which are relatively free from known toxic effect. Such a reactive diluent is the highly touted compound, N-vinyl-pyrrolidone. This pyrrolidone, however, has a strong odor which makes it use disagreeable to those applying the coating composition.

It is therefore an object of the invention to provide an actinically curable, oligomer based, coating composition which; uses a reactive diluent, is relatively free of known toxic effect and which does not have a strong odor. It is a further object of the invention to provide a cured coating from such a composition.

THE INVENTION

This invention relates to an actinic radiation curable composition. The composition comprises (a) an oligomer having a molecular weight within the range of from about 200 to 3000 and which is end-capped with reactive functional groups to provide sites for free radical polymerization by actinic radiation and (b), as an reactive diluent, a N-vinyl-2-oxazolidinone having the formula,

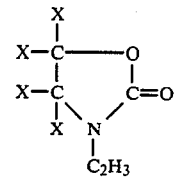

wherein each "X" is independently selected from the group consisting of hydrogen and alkyl radicals. The alkyl radicals will contain from 1 to about 4 carbon atoms.

This invention also relates to the coating realized from actinically curing the just described composition. This coating will contain a polymer, which is at least in part, a polymerization product of the oligomer and the N-vinyl-2-oxazolidinone. It has been found that the coatings of this invention have enhanced oxygen permeability.

Further, this invention relates to a process for curing the above described oligomer by co-mixing with it, as a reactive diluent, the above described N-vinyl-2-oxazolidinone. The resultant mixture is then exposed to actinic radiation to achieve a coating which is dry and solid.

The oligomers used in the compositions, coatings and processes of this invention are preferably end-capped with acrylate groups, methacrylate groups, vinyl ether groups, alkyl ether groups or any combinations thereof. Due to their ease of polymerization, acrylate and methacrylate end-capped oligomers are most preferred. These preferred oligomers can be represented by the formula:

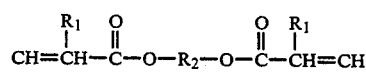

in which $R_1$ is independently selected from hydrogen and methyl and in which $R_2$ represents the backbone of the oligomer and is substantially comprised of polyester units, urethane units, epoxy units, polyether units or acrylic units. The selection of the particular units to form the backbone will be dependent in part upon the physical properties desired for the resultant cured coating.

Oligomers of acrylated polyesters have low viscosities and the coatings produced therefrom have good weatherability. These oligomers are manufactured by condensation reactions. For example, a particularly useful acrylated polyester is the one synthesized from acrylic acid and a 1,6-hexanediol/adipic acid polyester. Maleic anhyrdride or some other unsaturated dibasic acid can be used to replace a portion of the adipic acid. It is also possible to use a hydroxy functional acrylate or a dicarboxy functional polyester.

Acrylated urethane oligomers are used to make coatings having exceptional abrasion resistance and flexibility. These coatings also possess toughness, hardness, and chemical resistance. A wide choice of polyethers, polyester diols and polyols can be reacted with a variety of aliphatic and aromatic isocyanates to synthesize the oligomer backbone, which is then end-capped with a hydroxylalkyl acrylate. Other examples of polyester urethanes are the polycaprolactone polyols reacted with diisocyanates and end-capped with 2-hydroxypropyl acrylate. Hydroxy-rich alkyds or polyesters which have been reacted with diisocyanates can also be endcapped with hydroxyalkyl acrylates to form ultra-violet light curable oligomers.

Coatings based on acrylated epoxy oligomers have excellent adhesion, penetration, hardness, and chemical resistance. Exemplary of such oligomers are acrylated epoxidized soybean oils and bisphenol A based epoxy diacrylates.

Acrylated polyether oligomer based coatings possess abrasion resistance, flexibility, and toughness. Many oligomer variations are available by changing the polyether polyol functionality from 2 to 6 and by varying the molecular weight. Formation of polyether acrylate is achieved by the polycondensation of propylene glycol to a polypropylene glycol ether and end-capping such with acrylic acid.

Acrylated acrylics are especially useful for outdoor applications. One example, is the acrylated acrylic produced by the acrylation of a glycidyl methacrylate terpolymer with acrylic acid.

As before mentioned, the N-vinyl-2-oxazolidinones of this invention have "X" constitutents which are independently selected from the group consisting of hydrogen and alkyl radicals in which the alkyl radical contains from 1 to about 4 carbon atoms. Exemplary of such oxazolidinones are: N-vinyl-5-methyl-2-oxazolidinone; N-vinyl-2-oxazolidinone; N-vinyl-4-methyl-2-oxazolidinone; N-vinyl-5-ethyl-4-methyl-2-oxazolidinone; N-vinyl-5-butyl-2-oxazolidinone; N-vinyl-4-propyl-2-oxazolidinone; and N-vinyl-4,4-diethyl-5,5-dimethyl-2-oxazolidinone. The preferred oxazolidinones of this invention are those in which the "X" constitutent is chosen so that three of the constituent members are hydrogen with the remaining constituent member being an alkyl radical. For these compounds it is preferred that the alkyl radicals be methyl or ethyl radicals. A particularly useful and most highly preferred oxazolidinone of this invention is N-vinyl-5-methyl-2-oxazolidinone.

The N-vinyl-2-oxazolidinones of this invention and the processes for producing same are disclosed in U.S. Pat. Nos. 2,818,362 and 2,919,279, which disclosures are incorporated herein by reference.

The respective amounts of the oligomer and the N-vinyl-2-oxazolidinones selected can vary widely so long as the properties of the resultant cured coatings are not adversely affected. Generally the oligomer and the selected N-vinyl-2-oxazolidinone are present, respectively, in a ratio by weight within the range of from about 1:5 to about 10:1 and preferrably within the range of from about 2:3 to about 3:7. At higher ratios, e.g., those rich in oligomer, the uncured coating composition tends to have too high a viscosity. This high viscosity makes it difficult to apply the uncured coating composition to the substrate. At lower ratios the resultant cured coating composition tends to be too hard and inflexible.

If the actinic radiation curing of the coating composition is to be achieved with ultra-violet light, a photoinitiator and/or a photosensitizer are used in the composition. Such initiators and sensitizers are useful in controlling and making more efficient the polymerization reaction which is characteristic of the curing process. Photoinitiators are compounds which absorb photons and thereby obtain energy to form radical pairs, at least one of which is available to initiate addition polymerization in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator.

Most of the well known photoinitiators may be used in the coating compositions of the invention. Suitable initiators are vicinal ketaldonyl compounds (i.e. compounds containing a ketone group and an aldehyde group), for example: diacetyl; 2,3-pentanedione; 2,3-octanedione; 1-phenyl-1,2-butanedione; 2,2-dimethyl-4-phenyl-3,4-butanedione; phenyl-glyoxal; and diphenyltriketone. Aromatic diketones, e.g., anthraquinone and acryloins, such as, benzoin are also useful initiators. Other suitable initiators are pivaloin acryloin ethers, such as, benzoin-methyl-ether, benzoin-ethyl-ether, benzoin-butyl-ether, benzoin-isobutyl-ether and benzoin-phenyl-ether. Alpha-hydrocarbon substituted aromatic acyloins may also be used, including alpha-methyl-methyl-benzoin, alpha-alkyl-benzoin (as in U.S. Pat. No. 2,722,512) and phenylbenzoin. Still, other initiators are diaryl ketones, e.g., benzophenone and dinaphthyl ketone, and organic disulfides, such as, diphenyldisulfide. The photoinitiator can also be used with synergistic agents, e.g., a tertiary amine, to enhance the conversion of photo-absorbed energy to polymerization initiating free radicals. Preferred initiators are: alpha, alpha-diethoxyacetophenone; alpha, alpha-demethoxy-alpha-phenylacetophenone, dimethoxyphenylacetophenone, and a benzoin ether such as Vicure 10 which is available from Stauffer Chemical Co. The photoinitiator is present in the coating composition in an amount sufficient to initiate the desired polymerization under the influence of the amount of actinic light energy absorbed. If the concentration of photoinitiator is too high, curing may occur only at the surface. However, if the photoinitiator concentration is too low the exposure time needed to achieve curing may be too long from a economical stand point. The coating composition generally contains from 0.01 to 10 weight percent of photoinitiator based on the weight of the coating composition.

Exemplary of photosensitizers which can be used alone or in combination with a photoinitiator are: benzophenone; 4,4 bis(N,N-dimethylamino)benzophenone; 9,10-phenthrenequinoine; xanthone; thioxanthone; 2-chlorothixanthone; benzil; and 9,10-anthraquinone. The amount of photosensitizer used in the coating composition is best determined empirically and will be dependent upon the curing time desired, the available actinic light energy and the chemical and physical nature of the components making up the composition.

The coating compositions of this invention can also contain other conventional additives such as; addition polymerization inhibitors, surfactants, flow control and leveling agents, organic and inorganic dyestuffs and pigments, fillers, plasticizers, lubricants, and reinforcing agents.

Generally the subject coating compositions are formulated by adding the selected N-vinyl-2-oxazolidinone reactive diluent to the oligomer. However, the oligomer can be added to the reactive diluent. After such addition, blending or stirring of the mixture can be utilized to insure homogenity. The addition of the before mentioned additives can also be performed contemporaneously during the oligomer/reactive diluent addition.

The coating composition of this invention is generally applied to a substrate as a film having a thickness within the range of from 0.1 to about 20 mils. However, thicker coatings, i.e., up to a 1000 mils thick are possible. To prevent discoloration of the resultant cured coating it is preferred that the curing occur under an inert atmosphere such as that provided by nitrogen. The coating composition may be applied in any conventional manner such as by spraying, printing, brushing, dipping, roll coating and the like. The substrates which may be coated with the composition may vary widely in their properties. Organic substrates such as wood, fiber board, particle board, composition board, paper and cardboard may be used. Various polymers, such as polyesters, polyamides, cured phenolic resins, cured aminoplasts, acrylics, polyurethanes and rubber are also suitable. Inorganic substrates are exemplified by glass, guartz and ceramic materials. Many metallic substrates may be coated. Exemplary metallic substrates are iron, steel, stainless steel, copper, brass, bronze, aluminium, magnesium, titanium, nickel, chromium, zinc and various alloys.

As used herein the term actinic radiation refers to any radiation source which will produce free radicals and induce addition polymerization of vinyl bonds. The actinic radiation is most conveniently provided by ultra-violet light or by electron beam. When ultra-violet light is utilized as the actinic radiation, the before described photoinitiators and photosensitizers are used. When electron beam radiation is utilized, due to its higher energy level, no photoinitiator or photosensitizer is necessary.

Any suitable source which emits ultra-violet light may be used for ultra-violet actinic radiation. Suitable sources are mercury arcs, carbon arcs, low pressure mercury lamps, medium pressure mercury lamps, high pressure mercury lamps, swirl-flow plasma arcs, ultra-violet light emitting diodes and ultra-violet light emitting lasers. Particularly preferred ultra-violet light emitting lamps are the medium and high pressure mercury vapor type.

A preferred electron beam system uses a wide curtain of electrons which are directed from a linear cathode. The curtain of electrons from the cathode gun is accelerated to sufficient velocity by a high KV potential, e.g. 200 KV, and emerges from the chamber through a foil window onto the coated substrate. Electron beam curing of the coating composition is generally achieved at less than 5M rads and generally at 2M rads. Curing at greater than 8M rads is deemed unacceptable because of the high cost.

The cured coatings of this invention exhibit enhanced oxygen permeability—indeed some compositions have been found to have an oxygen permeability at 23.5° C. of 9320 cc-mil/$m^2$-day-atm $O_2$ as measured by ASTM D 3985-81. Coating compositions formulated in accordance with the teachings herein, but without the selected oxazolidinone, had oxygen permeabilities of only about 2500 cc-mils/$m^2$-day-atm $O_2$ using the same ASTM procedure.

The coatings formed by the coating compositions of the invention are useful in formulating printing inks, providing protective coatings on various substrates, imparting gloss to printed substrates and any of the other well known applications for actinically cured coating compositions.

The inventions herein described are further illustrated by the following non-limiting examples. In the examples some compounds, compositions and materials are identified by their manufacturer's designated name. They are as folows:

| Compound, Composition Material | Function/Description | Manufacturer or Distributor |
| --- | --- | --- |
| CELRAD 6700 | urethane acrylate oligomer | Celanese Chemical Co., Dallas, TX |
| CELRAD 3700 | epoxy acrylate oligomer | Celanese Chemical Co., Dallas, TX |
| IRGACURE 651 | photoinitiator | Ciba Geigy, Corp. Hawthorne, N.Y. |
| IRGACURE 184 | photoinitiator | Ciba Geigy, Corp. Hawthorne, N.Y. |
| UVITHANE 783 | polyester urethane acrylate oligomer | Morton Thickol, Inc., Specialty Chemical Div. Trenton, N.J. |
| BONDERITE 37 | treatment applied to cold rolled steel test panel | Parker Chemical Co., Morenci, Michigan |

Various properties of the cured coatings in the examples were measured as follows:

| Test | Procedure |
| --- | --- |
| Pencil Hardness | ASTM D 3363 |
| Cross Hatch Adhesion | ASTM D 3359 |
| Mandrel | ASTM D 3111 (slightly modified) |
| Solvent Resistance | Acetone on cloth double rub over coating, 100 repetitions. |

EXAMPLE I

A thoroughly mixed composition 21.9 g of CELRAD 6700, 14.6 g N-vinyl-5-methyl-2-oxazolidinone (93% pure) and 0.9 g IRGACURE 651 was prepared. A 1 mil thick film of this composition was applied to a BONDERITE 37 treated test panel with a ½" wire wound rod. The thus coated test panel was then exposed, in air, to an ultra violet light from a 250 watt Hanovia medium pressure mercury vapor lamp until the coating was observed to have been cured. The cured coating was clear, glossy and had a Pencil Hardness of 2H.

EXAMPLE II

The procedure of Example I was repeated except that the composition additionally contained 3 g of trimethylolpropane triacrylate (to increase the cross link density of the cured coating.) The resultant cured coating was hard, glossy and had a Pencil Hardness of 5H.

EXAMPLE III

A well mixed composition containing 59.6 g UVITHANE 783, 12.8 g N-vinyl-5-methyl-2-oxazolidinone (93% pure), 12.8 g diethyleneglycol monoethylether acrylate (an additional diluent) and 1.76 g IRGACURE 651 was prepared. This composition was applied as a 1 mil thick film by a ½ wire wound rod to BONDERITE 37 treated test panels. The thus coated panels were cured while exposed to air and in an Ashdee UV Oven having a 1-200 watt mercury vapor lamp. The Ashdee oven provides a variable speed conveyer on which the test panels are placed to carry them under the UV lamp.

(The Ashdee UV Oven is marketed by Ashdee Division of George Koch & Sons, Inc. of Evansville, Ind.) The following table summarizes the curing parameters and the results.

| Panel Test No. | Lamp Power | Conveyor Speed | No. of Passes | Pencil Hardness | 1" Mandrel | Solvent Resistance |
| --- | --- | --- | --- | --- | --- | --- |
| 1 | full | 42 ft/min | 1 | 2B | Passed | Good |
| 2 | full | 60 ft/min | 1 | 2B | Passed | Good |
| 3 | full | 131 ft/min | 1 | 2B | Passed | Good |
| 4 | full | 131 ft/min | 3 | 2B | Passed | Good |

EXAMPLE IV

The procedure of Example III was repeated except that the conveyor belt speed was changed and the composition contained 16.0 g UVITHANE 783, 3.44 g of diethyleneglycol monoethylether acrylate, (an additional diluent), 3.43 g N-vinyl-5-methyl-2-oxazolidinone and 0.45 g IRGACURE 651. The following table reports the parameters used and the test results.

| Test Panel No. | Lamp Power | Conveyor Speed | No. of Passes | Pencil Hardness |
| --- | --- | --- | --- | --- |
| 1 | full | 52 ft/min | 1 | HB |
| 2 | full | 211 ft/min | 1 | HB |

EXAMPLE V

A base composition containing 53 weight % CELRAD 3700, 31 weight % trimethylolpropane triacrylate, 10.7 weight % hexanediol diacrylate (to increase cross link density of the coating) and 5 weight % N-vinyl-5-methyl-2-oxazolidinone was prepared.

To 10 g of this base composition was added 2 g IRGACURE 651. The resultant admixture was applied to yield a 1 mil thick coat on a BONDERITE 37 treated test panel by the use of a ½ wire round bar. The coated test panel was passed through an Ashdee UV oven 3 times at the rate of 100 ft/min under two 200 watt/in medium pressure mecury lamps. The resultant curing occurred in air and the coating had a 70% Cross Hatch Adhesion. The coating failed the 1 inch Mandrel test and had a Pencil Hardness of 8H. Solvent Resistance was good as observed after 100 double rubs with acetone.

EXAMPLE VI

The base composition of Example V was mixed with 0.2 g IRGACURE 184 and the procedure of Example V was followed. The resultant cured coating had a 12% Cross Hatch Adhesion, a Pencil Hardness of 8H and exhibited good Solvent Resistance after at least 100 double rubs with acetone. The 1 inch Mandrel test was failed.

The foregoing examples illustrate the good physical characteristics of the coatings of this invention. Also, the curing times for the compositions are short thus showing high process efficiency. (Generally curing rates greater than 20 ft/min/lamp are needed for commercially acceptable compositions.)

We claim:

1. An actinic radiation curable composition which comprises:
    (a) an oligomer having a molecular weight within the range of from about 200 to about 3000 which is substantially comprised of polyester units and which is end capped with acrylate groups, methacrylate groups, or mixtures thereof to provide sites for free radical polymerization by actinic radiation; and
    (b) as a reactive diluent, an N-vinyl-2-oxazolidinone having the formula,

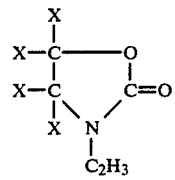

wherein each X is independently selected from the group consisting of hydrogen and alkyl radicals, said alkyl radicals containing from 1 to about 4 carbon atoms.

2. The composition of claim 1 wherein said oligomer is end capped with acrylate groups.

3. The composition of claim 1 wherein each X is selected so that three are said hydrogen and one is said alkyl radical.

4. The composition of claim 3 wherein said oligomer is endcapped with acrylate groups.

5. The composition of claim 4 wherein said N-vinyl-2-oxazolidinone is N-vinyl-5-methyl-2-oxazolidinone.

6. The composition of claim 5 wherein the weight ratio of said oligomer to said N-vinyl-2-oxazolidinone is between about 1:5 and about 10:1.

7. The composition of claim 1 wherein said N-vinyl-2-oxazolidinone is N-vinyl-5-methyl-2-oxazolidinone.

8. The composition of claim 1 wherein the weight ratio of said oligomer to said N-vinyl-2-oxazolidinone is between about 1:5 and about 10:1.

9. The composition of claim 1 wherein said composition further comprises a photoinitiator, a photosensitizer, or a mixture thereof.

10. The composition of claim 9 wherein each X is selected so that three are said hydrogen and one is said alkyl radical.

11. The composition of claim 10 wherein said N-vinyl-2-oxazolidinone is N-vinyl-5-methyl-2-oxazolidinone.

12. A highly oxygen permeable actinically cured coating which comprises a polymer including a polymerization product of:
    (a) a oligomer having a molecular weight within the range of from about 200 to about 3000 which is substantially comprised of polyester units and which is end capped with acrylate groups, methacrylate groups, or mixtures thereof to provide sites for free radical polymerization by actinic radiation; and
    (b) as a reactive diluent, an N-vinyl-2-oxazolidinone having the formula,

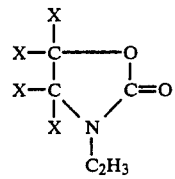

wherein each X is independently selected from the group consisting of hydrogen and alkyl radicals, said alkyl radicals containing from 1 to about 4 carbon atoms.

13. A process for curing, to form a dry, solid coating from an oligomer having a molecular weight within the range of from about 200 to about 3000 which is substantially comprised of polyester units and which is end capped with acrylate groups, methacrylate groups, or mixtures thereof to provide sites for free radical polymerization by actinic radiation, which process comprises:

(a) adding to said oligomer, as a reactive diluent, an N-vinyl-2-oxazolidinone having the formula,

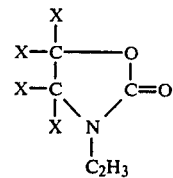

wherein each X is independently selected from the group consisting of hydrogen and alkyl radicals, said alkyl radicals containing from 1 to about 4 carbon atoms; and (b) exposing the mixture to actinic radiation.

14. The composition of claim 3 wherein the weight ratio of said oligomer to said N-vinyl-2-oxazolidinone is between about 1:5 and about 10:1.

* * * * *